(12) United States Patent
Lee

(10) Patent No.: US 10,226,057 B2
(45) Date of Patent: Mar. 12, 2019

(54) CULTIVATION METHOD OF COFFEE TREE BY RED GINSENG POWDERED EXTRACT

(71) Applicant: Koog-Jin Lee, Seongnam-si (KR)

(72) Inventor: Koog-Jin Lee, Seongnam-si (KR)

(73) Assignee: TROY CO., Ltd. (KR)

( * ) Notice: Subject to any disclaimer, the term of this patent is extended or adjusted under 35 U.S.C. 154(b) by 123 days.

(21) Appl. No.: 15/288,461

(22) Filed: Oct. 7, 2016

(65) Prior Publication Data
US 2017/0202235 A1 Jul. 20, 2017

(30) Foreign Application Priority Data
Jan. 19, 2016 (KR) .................. 10-2016-0006630

(51) Int. Cl.
*A23F 5/24* (2006.01)
*A01G 9/00* (2018.01)
*A01G 22/00* (2018.01)

(52) U.S. Cl.
CPC ............... *A23F 5/243* (2013.01); *A01G 9/00* (2013.01); *A01G 22/00* (2018.02)

(58) Field of Classification Search
CPC ......... A23F 5/243; A01G 22/00; A01G 1/001; A01G 9/00
See application file for complete search history.

(56) References Cited

FOREIGN PATENT DOCUMENTS

| CN | 104541881 | * | 4/2015 |
|----|-----------|---|--------|
| KR | 19960040128 | * | 12/1996 |
| KR | 1019970057054 | * | 5/1999 |
| KR | 1019990046159 | * | 1/2000 |
| KR | 1020000003330 | * | 8/2001 |
| KR | 20050001052 | * | 1/2005 |
| KR | 2011079569 | * | 7/2011 |

OTHER PUBLICATIONS

English Translation for CN 104541881 published Apr. 2015.*
English Translation for KR 2011079569 published Jul. 2011.*
English Translation for KR 1020000003330 published Aug. 2001.*
English Translation for KR 1019990046159 published Jan. 2000.*
English Translation for KR 1019970057054 published May 1999.*
English Translation for KR 19960040128 published Dec. 1996.*
English Translation for KR 20050001052 published Jan. 2005.*

* cited by examiner

*Primary Examiner* — Anthony J Weier
(74) *Attorney, Agent, or Firm* — Rodman & Rodman LLP

(57) ABSTRACT

A cultivation method of coffee tree by red ginseng powdered extract is provided, and particularly provided is a cultivation method of coffee tree through environment-friendly and rest (artificial dormant period) process using a red ginseng, and drink composition and food additive manufactured by the cultivation method of coffee tree by red ginseng, the method including: supplying red ginseng powdered extract aqueous solution to coffee seeds; and adjusting moisture of soil planted with coffee seeds. The cultivation method of coffee tree by red ginseng powdered extract has an advantageous effect in that coffee beans can be harvested having, as active ingredient, ginsenoside of high internal absorption rate capable of preventing occurrences of infectious diseases and pests by increasing immunity levels of coffee trees without using chemical fertilizers at all, and by enhancing germination percent of coffee seeds and coffee bean crops. The method has another advantageous effect of providing a drink composition and a food additive containing, as active ingredient, a coffee bean extract including ginsenoside of high internal absorption rate.

7 Claims, 14 Drawing Sheets

FIG. 1

| No.: D2015120386 | | | | |
|---|---|---|---|---|
| Examination Certificate of Ingredient Contents Analysis | | | | |
| Sample Name | Coffee Seed HO-20 | Manufactured date (Shelf life) | Dec. 01, 2015 | |
| Client | Company name | Lee, Guk-Jin | | |
| | Address | 102, Yuhan Village 3300 Taepyung-dong, Sujong-gu, Sungnam-si, Gyunggi-do, Korea | | |
| | Name | Lee, Guk-Jin | | |
| Manufacturing No. | | | Sample Reception Date | Dec. 04, 2015 |
| Purpose of Request for Examination | For submission | | Sample Reception No. | D2015120386 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 7.31mg/g | Lee, Sun-Jung |

[ Crude saponin ] Analysis method: Health Functional Food Code (Old version)/red ginseng concentrate Dec. 17, 2015
Korea Health Supplement Institute (officially sealed)

FIG. 2

| No.: D2015120385 | | | |
|---|---|---|---|
| Examination Certificate of Ingredient Contents Analysis | | | |
| Sample Name | Coffee Seed HO-30 | Manufactured date (Shelf life) | Dec. 01, 2015 |
| Client — Company name | Lee, Guk-Jin | | |
| Client — Address | 102, Yuhan Village 3300 Taepyung-dong, Sujeong-gu, Sungnam-si, Gyunggi-do, Korea | | |
| Client — Name | Lee, Guk-Jin | | |
| Manufacturing No. | | Sample Reception Date | Dec. 04, 2015 |
| Purpose of Request for Examination | For submission | Sample Reception No. | D2015120385 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 6.03mg/g | Lee, Sun-Jung |

[ Crude saponin ] Analysis method: Health Functional Food Code (Old version)/red ginseng concentrate Dec. 17, 2015

Korea Health Supplement Institute (officially sealed)

FIG. 3

| No.: D2015120384 | | | | |
|---|---|---|---|---|
| Examination Certificate of Ingredient Contents Analysis | | | | |
| Sample Name | | Coffee Seed HO-40 | Manufactured date (Shelf life) | Dec. 01, 2015 |
| Client | Company name | Lee, Guk-Jin | | |
| | Address | 102, Yuhan Village 3300 Taepyung-dong, Sujong-gu, Sungnam-si, Gyunggi-do, Korea | | |
| | Name | Lee, Guk-Jin | | |
| Manufacturing No. | | | Sample Reception Date | Dec. 04, 2015 |
| Purpose of Request for Examination | | For submission | Sample Reception No. | D2015120384 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 6.41mg/g | Lee, Sun-Jung |

[ Crude saponin ] Analysis method: Health Functional Food Code (Old version)/red ginseng concentrate Dec. 17, 2015

Korea Health Supplement Institute (officially sealed)

FIG. 4

| No.: D2015120383 | | | | |
|---|---|---|---|---|
| Examination Certificate of Ingredient Contents Analysis | | | | |
| Sample Name | Coffee Seed HO-50 | | Manufactured date (Shelf life) | Dec. 01, 2015 |
| Client | Company name | Lee, Guk-Jin | | |
| | Address | 102, Yuhan Village 3300 Taepyung-dong, Sujong-gu, Sungnam-si, Gyunggi-do, Korea | | |
| | Name | Lee, Guk-Jin | | |
| Manufacturing No. | | | Sample Reception Date | Dec. 04, 2015 |
| Purpose of Request for Examination | For submission | | Sample Reception No. | D2015120383 |

The result of examination for sample requested on this KHSI
(Korea Health Supplement Institute) is as follows Chief Examiner: Kim, Chong-Hwe

| Examination item | Result | Examiner |
|---|---|---|
| Crude saponin (mg/g) | 8.04mg/g | Lee, Sun-Jung |

[ Crude saponin ] Analysis method: Health Functional Food Code
(Old version)/red ginseng concentrate Dec. 17, 2015

Korea Health Supplement Institute (officially sealed)

FIG. 5

| No.: D2015120382 | | | | |
|---|---|---|---|---|
| Examination Certificate of Ingredient Contents Analysis | | | | |
| Sample Name | | Coffee Seed HO-60 | Manufactured date (Shelf life) | Dec. 01, 2015 |
| Client | Company name | Lee, Guk-Jin | | |
| | Address | 102, Yuhan Village 3300 Taepyung-dong, Sujong-gu, Sungnam-si, Gyunggi-do, Korea | | |
| | Name | Lee, Guk-Jin | | |
| Manufacturing No. | | | Sample Reception Date | Dec. 04, 2015 |
| Purpose of Request for Examination | | For submission | Sample Reception No. | D2015120382 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 5.91mg/g | Lee, Sun-Jung |

[ Crude saponin ] Analysis method: Health Functional Food Code (Old version)/red ginseng concentrate Dec. 17, 2015

Korea Health Supplement Institute (officially sealed)

FIG. 6

| No.: D2015120381 | | | | |
|---|---|---|---|---|
| Examination Certificate of Ingredient Contents Analysis | | | | |
| Sample Name | Coffee Seed HO-70 | | Manufactured date (Shelf life) | Dec. 01, 2015 |
| Client | Company name | Lee, Guk-Jin | | |
| | Address | 102, Yuhan Village 3300 Taepyung-dong, Sujong-gu, Sungnam-si, Gyunggi-do, Korea | | |
| | Name | Lee, Guk-Jin | | |
| Manufacturing No. | | | Sample Reception Date | Dec. 04, 2015 |
| Purpose of Request for Examination | For submission | | Sample Reception No. | D2015120381 |

The result of examination for sample requested on this KHSI
(Korea Health Supplement Institute) is as follows Chief Examiner: Kim, Chong-Hwe

| Examination item | Result | Examiner |
|---|---|---|
| Crude saponin (mg/g) | 7.28mg/g | Lee, Sun-Jung |

[ Crude saponin ] Analysis method: Health Functional Food Code
(Old version)/red ginseng concentrate Dec. 17, 2015

Korea Health Supplement Institute (officially sealed)

FIG. 7

| No.: D2015120380 | | | | |
|---|---|---|---|---|
| Examination Certificate of Ingredient Contents Analysis | | | | |
| Sample Name | Coffee Seed Special -20 | | Manufactured date (Shelf life) | Dec. 01, 2015 |
| Client | Company name | Lee, Guk-Jin | | |
| | Address | 102, Yuhan Village 3300 Taepyung-dong, Sujong-gu, Sungnam-si, Gyunggi-do, Korea | | |
| | Name | Lee, Guk-Jin | | |
| Manufacturing No. | | | Sample Reception Date | Dec. 04, 2015 |
| Purpose of Request for Examination | For submission | | Sample Reception No. | D2015120380 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 5.59mg/g | Lee, Sun-Jung |

[ Crude saponin ] Analysis method: Health Functional Food Code (Old version)/red ginseng concentrate Dec. 11, 2015

Korea Health Supplement Institute (officially sealed)

FIG. 8

| No.: D2015120379 |||||
|---|---|---|---|---|
| Examination Certificate of Ingredient Contents Analysis |||||
| Sample Name | Coffee Seed Special -30 || Manufactured date (Shelf life) | Dec. 01, 2015 |
| Client | Company name | Lee, Guk-Jin |||
|  | Address | 102, Yuhan Village 3300 Taepyung-dong, Sujong-gu, Sungnam-si, Gyunggi-do, Korea |||
|  | Name | Lee, Guk-Jin |||
| Manufacturing No. | | | Sample Reception Date | Dec. 04, 2015 |
| Purpose of Request for Examination | For submission || Sample Reception No. | D2015120379 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 5.91mg/g | Lee, Sun-Jung |

[ Crude saponin ] Analysis method: Health Functional Food Code (Old version)/red ginseng concentrate Dec. 11, 2015

Korea Health Supplement Institute (officially sealed)

FIG. 9

| No.: D2015120378 |||||
|---|---|---|---|---|
| Examination Certificate of Ingredient Contents Analysis |||||
| Sample Name | Coffee Seed Special -40 || Manufactured date (Shelf life) | Dec. 01, 2015 |
| Client | Company name | Lee, Guk-Jin |||
| | Address | 102, Yuhan Village 3300 Taepyung-dong, Sujong-gu, Sungnam-si, Gyunggi-do, Korea |||
| | Name | Lee, Guk-Jin |||
| Manufacturing No. ||| Sample Reception Date | Dec. 04, 2015 |
| Purpose of Request for Examination | For submission || Sample Reception No. | D2015120378 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 5.93mg/g | Lee, Sun-Jung |

[ Crude saponin ] Analysis method: Health Functional Food Code (Old version)/red ginseng concentrate Dec. 11, 2015

Korea Health Supplement Institute (officially sealed)

FIG. 10

| No.: D2015120377 | | | | |
|---|---|---|---|---|
| Examination Certificate of Ingredient Contents Analysis | | | | |
| Client | Company name | Lee, Guk-Jin | | |
| | Address | 102, Yuhan Village 3300 Taepyung-dong, Sujong-gu, Sungnam-si, Gyunggi-do, Korea | | |
| | Name | Lee, Guk-Jin | | |
| Sample Name | | Coffee Seed Special -50 | Manufactured date (Shelf life) | Dec. 01, 2015 |
| Manufacturing No. | | | Sample Reception Date | Dec. 04, 2015 |
| Purpose of Request for Examination | | For submission | Sample Reception No. | D2015120377 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 6.15mg/g | Lee, Sun-Jung |

[ Crude saponin ] Analysis method: Health Functional Food Code (Old version)/red ginseng concentrate Dec. 11, 2015

Korea Health Supplement Institute (officially sealed)

FIG. 11

| No.: D2015120376 | | | | |
|---|---|---|---|---|
| Examination Certificate of Ingredient Contents Analysis ||||| 
| Sample Name || Coffee Seed Special -60 | Manufactured date (Shelf life) | Dec. 01, 2015 |
| Client | Company name | Lee, Guk-Jin ||| 
| | Address | 102, Yuhan Village 3300 Taepyung-dong, Sujong-gu, Sungnam-si, Gyunggi-do, Korea ||| 
| | Name | Lee, Guk-Jin ||| 
| Manufacturing No. ||| Sample Reception Date | Dec. 04, 2015 |
| Purpose of Request for Examination || For submission | Sample Reception No. | D2015120376 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 6.72mg/g | Lee, Sun-Jung |

[ Crude saponin ] Analysis method: Health Functional Food Code (Old version)/red ginseng concentrate Dec. 11, 2015

Korea Health Supplement Institute (officially sealed)

FIG. 12

| No.: D2015120375 | | | | | |
|---|---|---|---|---|---|
| Examination Certificate of Ingredient Contents Analysis | | | | | |
| Sample Name | | Coffee Seed Special -70 | Manufactured date (Shelf life) | | Dec. 01, 2015 |
| Client | Company name | Lee, Guk-Jin | | | |
| | Address | 102, Yuhan Village 3300 Taepyung-dong, Sujong-gu, Sungnam-si, Gyunggi-do, Korea | | | |
| | Name | Lee, Guk-Jin | | | |
| Manufacturing No. | | | Sample Reception Date | | Dec. 04, 2015 |
| Purpose of Request for Examination | | For submission | Sample Reception No. | | D2015120375 |

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 6.69mg/g | Lee, Sun-Jung |

[ Crude saponin ] Analysis method: Health Functional Food Code (Old version)/red ginseng concentrate Dec. 11, 2015

Korea Health Supplement Institute (officially sealed)

FIG. 13

| No.: D2015120390 |||||
|---|---|---|---|---|
| Examination Certificate of Ingredient Contents Analysis |||||
| Sample Name | Coffee Tree Special Stem | Manufactured date (Shelf life) | Dec. 01, 2015 ||
| Client | Company name | Lee, Guk-Jin |||
| | Address | 102, Yuhan Village 3300 Taepyung-dong, Sujong-gu, Sungnam-si, Gyunggi-do, Korea |||
| | Name | Lee, Guk-Jin |||
| Manufacturing No. | | Sample Reception Date | Dec. 04, 2015 ||
| Purpose of Request for Examination | For submission | Sample Reception No. | D2015120390 ||

The result of examination for sample requested on this KHSI (Korea Health Supplement Institute) is as follows Chief Examiner: Kim, Chong-Hwe

| Examination item | Result | Examiner |
|---|---|---|
| Crude saponin (mg/g) | 2.11mg/g | Lee, Sun-Jung |

[ Crude saponin ] Analysis method: Health Functional Food Code (Old version)/red ginseng concentrate Dec. 22, 2015

Korea Health Supplement Institute (officially sealed)

FIG. 14

| No.: D2015120388 | | | |
|---|---|---|---|
| Examination Certificate of Ingredient Contents Analysis | | | |
| Sample Name | Coffee Tree Special Leaf | Manufactured date (Shelf life) | Dec. 01, 2015 |
| Client | Company name | Lee, Guk-Jin | |
| | Address | 102, Yuhan Village 3300 Taepyung-dong, Sujong-gu, Sungnam-si, Gyunggi-do, Korea | |
| | Name | Lee, Guk-Jin | |
| Manufacturing No. | | Sample Reception Date | Dec. 04, 2015 |
| Purpose of Request for Examination | For submission | Sample Reception No. | D2015120388 |

The result of examination for sample requested on this KHSI
(Korea Health Supplement Institute) is as follows Chief Examiner: Kim, Chong-Hwe

| Examination item | Result | Examiner |
|---|---|---|
| Crude saponin (mg/g) | 6.60mg/g | Lee, Sun-Jung |

[ Crude saponin ] Analysis method: Health Functional Food Code
(Old version)/red ginseng concentrate Dec. 22, 2015
Korea Health Supplement Institute (officially sealed)

CULTIVATION METHOD OF COFFEE TREE BY RED GINSENG POWDERED EXTRACT

The present application is based on, and claims priority from the Korean Patent Application Number 10-2016-0006630 filed on Jan. 19, 2016, the entire contents of which are incorporated by reference herein in their entirety.

TECHNICAL FIELD

The teachings in accordance with the exemplary embodiments of this present disclosure generally relate to a cultivation method of coffee tree by red ginseng powdered extract, and more particularly to a cultivation method of coffee tree through environment-friendly and rest (artificial dormant period) process using a red ginseng, and drink composition and food additive manufactured by the cultivation method of coffee tree by red ginseng.

BACKGROUND

Coffee is a kind of drinks prepared by extracting and processing coffee beans of a coffee tree. The coffee tree is a dicotyledon belonging to rubiaceae. Although about 40 kinds of coffee trees grow in Africa and tropical regions of Asia, coffea Arabica and coffea Canephora are commonly called two parent lines of coffee. The coffee tree blossoms (white color) about two years after planting, and bears red or yellow fruits (beans, cherries) about three years after planting.

The coffee trees are harvested in a tropical region between south latitude 25° C. and north latitude 25° about the Equator, the region of which is called a coffee belt or a coffee zone. Arabica coffee has a picky cultivating conditions, grows under an average temperature of 15~24° C., and requires rainy season and dry season for growth. Furthermore, the Arabic coffee prefers ash soil abundant in organic substances and good in drainage, adequate sun shine and a high land above 800 m.

Meantime, heavy rains and strong wind are not good for the Arabic coffee. Robusta coffee may be cultivated as long as a temperature of 24° C.~30° C. on a high land soil at a latitude under 600 m is maintained.

A seed of the coffee bean peeled off with husk, flesh, endocarp, and silver skin is called a green bean. Coffee beans are made from the green bean by roasting, and coffee drink is prepared by extracting the green bean substance using water. Consumption of coffee drinks increases at a great pace, and kinds of coffee drinks are gradually diversified in response to consumer tastes.

Meantime, harvest of coffee is greatly influenced by infectious diseases and harmful insects. A first disease may be anthrax. The anthrax is a disease that causes to produce round red spots on the coffee bean, i.e., on the cherry coffee skin, and is a fungus disease generated on the cherry itself.

A second disease is uredinales causing leaf molds which in turn make leaves to wither by generating yellow spots on rear surfaces of coffee tree leaves, and the coffee trees become dead in three years thereafter.

A third one is occurrence of coffee berry borer. The coffee berry borer, the most important coffee pest worldwide, degrades the commodity value of coffee beans by boring from inside of cherry.

A last and fourth disease of black bean phenomenon refers to a phenomenon where defective beans are harvested due to insufficient supply of nutrients and water to the coffee trees at right times. The more the black bean phenomenon occurs, the more the coffee crop decreases as much.

In order to reduce the occurrences of diseases and pests, although researches have been waged to cultivate the coffee trees by using chemical fertilizers, new problems have been raised that the chemical fertilizers play a bad influence on the environment. As a result, researches on environment-friendly seedlings and plant manufacturing methods capable of naturally reducing occurrences of diseases and pests without using chemical fertilizers at all are being made. However, there have been no researches made so far on coffee tree cultivating methods manufacturing coffee beans capable of reinforcing immunity levels and containing saponine.

CITED REFERENCE DOCUMENT

[Patent Document] Korea Registered Patent Publication No. 10-0415759 (Registration Date: Jan. 7, 2004)

SUMMARY

The present disclosure is provided to solve the aforementioned problems and it is an object to provide a cultivation method of coffee tree using red ginseng powdered extract in order to prevent occurrences of infectious diseases and pests by increasing immunity levels of coffee trees without using chemical fertilizers at all, to enhance germination percent of coffee seeds and coffee bean crops, and to harvest coffee beans having ginsenoside of high internal absorption rate as active ingredient, and drink composition and food additive prepared thereby.

In one general aspect of the present disclosure, there is provided a cultivation method of coffee tree using red ginseng powdered extract, the method comprising: resting a coffee seed by dipping the coffee seed in a red ginseng aqueous solution; and planting the rested coffee seed in a soil.

In an exemplary embodiment, the red ginseng powdered extract may include ginsenoside removed of hydroxyl group as active ingredient.

In an exemplary embodiment, the red ginseng aqueous solution may be a mixture of water 100 parts by weight and red ginseng powdered extract 10~30 parts by weight.

In an exemplary embodiment, the step of resting the coffee seed may include dipping the coffee seed in the red ginseng powdered extract aqueous solution under a room temperature of 20~30° C.

In an exemplary embodiment, the method may further comprise supplying red ginseng powdered extract aqueous solution to a soil planted with the coffee seed, subsequent to the step of planting the rested coffee seed in a soil.

In an exemplary embodiment, the step of supplying red ginseng powdered extract aqueous solution may include continuously supplying the red ginseng powdered extract aqueous solution of 1,500 mm~3,000 mm precipitation to the soil planted with the coffee seed at each time interval for 2~5 days under a room temperature of 20° C.~30° C.

In an exemplary embodiment, the step of planting the rested coffee seed in a soil may include planting the rested coffee seed in a flower pot.

In another general aspect of the present disclosure, there is provided a drink composition containing, as active ingredient, coffee bean powdered extract containing ginsenoside removed of hydroxyl group produced by the cultivating method of coffee tree.

In still another general aspect of the present disclosure, there is provided a food additive containing, as active ingredient, coffee bean powdered extract containing ginsenoside removed of hydroxyl group produced by the cultivating method of coffee tree.

Advantageous Effects

The cultivation method of coffee tree using red ginseng powdered extract according to the present disclosure has an advantageous effect in that coffee beans can be harvested having, as active ingredient, ginsenoside of high internal absorption rate capable of preventing occurrences of infectious diseases and pests by increasing immunity levels of coffee trees without using chemical fertilizers at all, and by enhancing germination percent of coffee seeds and coffee bean crops. Furthermore, the present disclosure has another advantageous effect of providing a drink composition and a food additive containing, as active ingredient, a coffee bean extract including ginsenoside of high internal absorption rate.

BRIEF DESCRIPTION OF DRAWINGS

FIG. 1 is a copy of an examination certificate of ingredient contents analysis of ginsenoside removed of hydroxyl group in a sample of coffee bean having a rest period (20 parts by weight of red ginseng powdered extract aqueous solution) according to an exemplary embodiment of the present disclosure.

FIG. 2 is a copy of an examination certificate of ingredient contents analysis of ginsenoside removed of hydroxyl group in a sample of coffee bean having a rest period (30 parts by weight of red ginseng powdered extract aqueous solution) according to an exemplary embodiment of the present disclosure.

FIG. 3 is a copy of an examination certificate of ingredient contents analysis of ginsenoside removed of hydroxyl group in a sample of coffee bean having a rest period (40 parts by weight of red ginseng powdered extract aqueous solution) according to an exemplary embodiment of the present disclosure.

FIG. 4 is a copy of an examination certificate of ingredient contents analysis of ginsenoside removed of hydroxyl group in a sample of coffee bean having a rest period (50 parts by weight of red ginseng powdered extract aqueous solution) according to an exemplary embodiment of the present disclosure.

FIG. 5 is a copy of an examination certificate of ingredient contents analysis of ginsenoside removed of hydroxyl group in a sample of coffee bean having a rest period (60 parts by weight of red ginseng powdered extract aqueous solution) according to an exemplary embodiment of the present disclosure.

FIG. 6 is a copy of an examination certificate of ingredient contents analysis of ginsenoside removed of hydroxyl group in a sample of coffee bean having a rest period (70 parts by weight of red ginseng powdered extract aqueous solution) according to an exemplary embodiment of the present disclosure.

FIG. 7 is a copy of an examination certificate of ingredient contents analysis of ginsenoside removed of hydroxyl group in a sample of coffee bean (20 parts by weight of red ginseng powdered extract aqueous solution) produced according to an exemplary embodiment of the present disclosure.

FIG. 8 is a copy of an examination certificate of ingredient contents analysis of ginsenoside removed of hydroxyl group in a sample of coffee bean (30 parts by weight of red ginseng powdered extract aqueous solution) produced according to an exemplary embodiment of the present disclosure.

FIG. 9 is a copy of an examination certificate of ingredient contents analysis of ginsenoside removed of hydroxyl group in a sample of coffee bean (40 parts by weight of red ginseng powdered extract aqueous solution) produced according to an exemplary embodiment of the present disclosure.

FIG. 10 is a copy of an examination certificate of ingredient contents analysis of ginsenoside removed of hydroxyl group in a sample of coffee bean (50 parts by weight of red ginseng powdered extract aqueous solution) produced according to an exemplary embodiment of the present disclosure.

FIG. 11 is a copy of an examination certificate of ingredient contents analysis of ginsenoside removed of hydroxyl group in a sample of coffee bean (60 parts by weight of red ginseng powdered extract aqueous solution) produced according to an exemplary embodiment of the present disclosure.

FIG. 12 is a copy of an examination certificate of ingredient contents analysis of ginsenoside removed of hydroxyl group in a sample of coffee bean (70 parts by weight of red ginseng powdered extract aqueous solution) produced according to an exemplary embodiment of the present disclosure.

FIG. 13 is a copy of an examination certificate of ingredient contents analysis of ginsenoside removed of hydroxyl group in a sample of stem grown according to an exemplary embodiment of the present disclosure.

FIG. 14 is a copy of an examination certificate of ingredient contents analysis of ginsenoside removed of hydroxyl group in a sample of leaf grown according to an exemplary embodiment of the present disclosure.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Terms such as "first," "second," and other numerical terms when used herein do not imply a sequence or order unless clearly indicated by the context. These terms are used to distinguish one element from the other element. Thus, a first element, component, region, layer or section discussed below could be termed a second element, component, region, layer or section without departing from the teachings of the example embodiments.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

A cultivation method of coffee tree using red ginseng powdered extract according to an exemplary embodiment of the present disclosure comprises: resting a coffee seed by dipping the coffee seed in a red ginseng aqueous solution; and planting the rested coffee seed in a soil.

The step of resting the coffee seed by dipping the coffee seed in the red ginseng powdered extract aqueous solution according to an exemplary embodiment of the present disclosure includes dipping the coffee seed in the red ginseng powdered extract aqueous solution for a predetermined period of time. When the coffee seed is dipped in the red ginseng powdered extract aqueous solution, there is an effect of cleaning a skin of the coffee seed, whereby moisture can be maintained in the coffee seed for a long time, and the germination percent of coffee seed can be increased by the red ginseng powdered extract being directly absorbed in to the coffee seed. Furthermore, only high quality of seeds that sink in the red ginseng powdered extract aqueous solution can be selected.

The red ginseng powdered extract may include, as an active ingredient, ginsenoside removed of hydroxyl (—OH) group according to an exemplary embodiment of the present disclosure. The ginsenoside refers to saponin having a peculiar structure not existing in almost other plant kingdom than ginseng. The ginsenoside may be largely classified to protopanaxadiol saponin (hereinafter referred to as 'PPD') and protopanaxatriol saponin (hereinafter referred to as 'PPT').

PPD and PPT structures all include hydroxyl (—OH) group. PPD structure may include two hydroxyl (—OH) groups, and PPT structure may include three hydroxyl (—OH) groups. When PPD and PPT are introduced into body, intestinal microorganism of prevotellaoris removes the hydroxyl (—OH) group freom the PPD and PPT structures. The ginsenoside removed of hydroxyl (—OH) group by the prevotellaoris is greatly absorbed into body. However, the prevotellaoris may not exist in intestines of some constitutions depending on individual. In this case, the hydroxyl (—OH) group is not separated from the PPD and PPT structures, and therefore absorption rate of ginsenoside into body is very low.

As a result, in order to increase the absorption rate of ginsenoside into constitution not existent of prevotellaoris, artificial methods to remove the hydroxyl (—OH) group from the PPD and PPT structures may be employed. Using this process, coffee seeds may be dipped into red ginseng powdered extract aqueous solution including ginsenoside removed of hydroxyl (—OH) group as active ingredient.

The method of manufacturing red ginseng powdered extract including ginsenoside removed of hydroxyl (—OH) group as active ingredient may include manufacturing red ginseng juice, obtaining red ginseng juice and obtaining red ginseng powdered extract.

The step of manufacturing red ginseng juice is a step of mixing a mixture of ground dry red ginseng roots and dried red ginseng fine roots with water and applying heat to the mixture. The dried red ginseng may include dried red ginseng root 100 parts by weight and dried red ginseng fine root 40~45 parts by weight. Small particle-shaped dried red ginseng powder is small in terms of particle and melts well in water, and surface area of the powder is broad to allow active ingredients to be well discharged with water, whereby time for manufacturing red ginseng juice can be shortened.

When dried red ginseng root 100 parts by weight is mixed with dried red ginseng fine roots 40~45 parts by weight, efficacy of active ingredient and sweetness are most excellent. A mixture rate between dried red ginseng and water may be 1:2~4. Furthermore, when the heating temperature is less than 80° C., a red ginseng powdered extracting time may be prolonged and when the heating temperature is more than 90° C., an active ingredient contained in the red ginseng may be destructed. Furthermore, when the heating time is less than 16 hours, a red ginseng powdered extract may not be sufficiently extracted, and when the heating time is more than 20 hours, moisture may be evaporated more than is necessary to generate a variance in the active ingredient of the red ginseng juice.

The step of obtaining a red ginseng extract is obtaining a red ginseng powdered extract by removing red ginseng solid content through centrifugation of a red ginseng juice manufactured by heating a dried red ginseng powder and water. When the red ginseng juice is centrifugated, the red ginseng juice is divided to a red ginseng powdered extract which is a supernatant and a red ginseng solid content which is a pellet. At this time, the red ginseng extract containing a large amount of active ingredient is reserved and the red ginseng solid content is disposed of.

Preferably, the red ginseng juice may be centrifugated more than twice to remove the red ginseng solid content. More preferably, the centrifugation of red ginseng juice may be repeated 10~14 times to remove the red ginseng solid content and to obtain a high purity of red ginseng extract.

The step of obtaining red ginseng powdered extract is obtaining a red ginseng powdered extract by passing a red ginseng extract through a semipermeable membrane under a room temperature. When the red ginseng extract is passed through the semipermeable membrane, although moisture can pass through the semipermeable membrane, an active ingredient contained in the red ginseng extract cannot pass the semipermeable membrane. The moisture having passed the semipermeable membrane is removed, and the active ingredient remaining in the semipermeable membrane is obtained as red ginseng powdered extract.

Preferably, the step of obtaining red ginseng powdered extract may further include introducing a hydrogen ion from outside through a hydrogen ion supply route. When the hydrogen ion is supplied to the semipermeable membrane, the hydroxyl (—OH) group bonded to the ginsenoside can be removed without going through a high temperature processing course.

The method of manufacturing a red ginseng powdered extract may further include irradiating a UV (UltraViolet) light. Germs existent in the red ginseng extract can be removed, when the UV is irradiated to the red ginseng. Furthermore, the red ginseng extract may be dried under a room temperature and sterilized as well by irradiating a UV.

Preferably, the method of manufacturing a red ginseng powdered extract may further include vibrating and separating the red ginseng powdered extract and the semipermeable membrane for 1~3 hours. When the semipermeable membrane attached to the red ginseng powdered extract is applied with a vibration, the red ginseng powdered extract can be completely separated from the semipermeable membrane. When the vibration separation time is less than one hour, a separated amount may be small, but when the vibration separation time is more than 3 hours, no more separation may be made to unnecessarily prolong the vibration separation time. The red ginseng powdered extract aqueous solution may be a mixture of water 100 parts by weight and red ginseng powdered extract 10~30 parts by weight. When the red ginseng powdered extract is less than 10 parts by weight, no effect of red ginseng powdered extract can be expected to provide no influence on germination percent of coffee seeds. Furthermore, when the red ginseng powdered extract exceeds 30 parts by weight, no significant effect can be expected when compared with a mixture of red ginseng powdered extract 10~30 parts by weight.

The step of resting the coffee seeds according to an exemplary embodiment of the present disclosure may include dipping the coffee seeds in the red ginseng powdered extract aqueous solution under the temperature of 20~30° C. for 10~14 hours. When the temperature of the red ginseng powdered extract aqueous solution is less than 20° C., an amount of the red ginseng powdered extract and water may be small, and when the temperature of the red ginseng powdered extract aqueous solution exceeds 302, protein contained in the coffee seeds may be degenerated to disable germination of coffee seeds. Furthermore, when the diapause time of the coffee seeds is less than 10 hours, there may be no difference of germination percent of coffee seeds compared with that of when there is no diapause time, and when the diapause time of the coffee seeds exceeds 14 hours, moisture may be absorbed into the coffee seeds more than is necessary to decrease the germination percent of the coffee seeds.

FIGS. 1 to 6 are copies of an examination certificate of ingredient contents analysis on ginsenoside removed of hydroxyl (—OH) group in a sample of coffee bean according to an exemplary embodiment of the present disclosure.

It was confirmed that the ginsenoside removed of hydroxyl (—OH) group is detected from coffee seeds dipped in the red ginseng powdered extract aqueous solution containing the ginsenoside removed of hydroxyl (—OH) group as active ingredient. However, a conclusion has arrived that a mixture of red ginseng powdered extract is preferably 20 parts by weight, because the ginsenoside removed of hydroxyl (—OH) group does not increase, as the concentration of the red ginseng powdered extract aqueous solution containing the ginsenoside removed of hydroxyl (—OH) group as active ingredient increases.

The step of planting rested coffee seeds in a soil according to an exemplary embodiment of the present disclosure may be planting the rested coffee seeds in an environmental condition-adjusted soil in order to maintain predetermined moisture content. The environmental conditions may include amount of sunshine, temperature, moisture supply and humidity. Particularly, it is necessary to control a soil condition, because drainage of soil has a close relationship with the moisture content.

The method may further include supplying red ginseng powdered extract aqueous solution to a soil planted with the coffee seed, subsequent to the step of planting the rested coffee seed in a soil. The step of supplying the red ginseng powdered extract aqueous solution to a soil planted with the coffee seed may include supplying an amount of moisture similar to precipitation of coffee belt to a soil planted with the coffee seeds. The moisture supplied at this time may be the red ginseng powdered extract aqueous solution containing the ginsenoside removed of hydroxyl (—OH) group as active ingredient.

The step of supplying red ginseng powdered extract aqueous solution according to an exemplary embodiment of the present disclosure may include continuously supplying the red ginseng powdered extract aqueous solution of 1,500 mm~3,000 mm precipitation to the soil planted with the coffee seed at each time interval for 2~5 days under a room temperature of 20° C.~30° C. This environmental condition is similar to the coffee tree cultivating environment in the coffee belt.

When the temperature is less than 20° C., coffee tree leaves discolor to disable to generate coffee seeds of good quality, and when the temperature exceeds 30° C., flowers wither due to destruction of chlorophyll and coffee seeds cannot be born, whereby downy mildew may prosper. Furthermore, when the supply frequency of red ginseng powdered extract aqueous solution exceeds one time for two days, the coffee trees are excessively supplied with moisture to deteriorate the quality of coffee seeds, and when the supply frequency of red ginseng powdered extract aqueous solution is less than one time for each five days, the coffee trees are insufficiently supplied with moisture to create an obstacle to growth and formation of coffee trees.

When supply of red ginseng powdered extract aqueous solution is less than 1,500 mm precipitation, there may be generated an obstacle to growth of coffee trees, and when supply of red ginseng powdered extract aqueous solution is more 3,000 mm precipitation, there may be generated soil erosion, and therefore, it may take many hours to dry coffee seeds after harvest.

The step of planting the rested coffee seed in a soil according to an exemplary embodiment of the present disclosure may include planting the rested coffee seed in a flower pot. Because the Korea's soil is not adequate to growth of coffee trees, there is a need of making a soil environment similar to that of the coffee belt where coffee trees are largely grown. The coffee trees can grow only in a well-drained soil, such that coffee seeds are transplanted into a flower pot where drainage is easy.

FIGS. 7 to 12 are copies of an examination certificate of ingredient contents analysis on ginsenoside removed of hydroxyl (—OH) group in a sample of coffee bean manufactured according to an exemplary embodiment of the present disclosure.

It was confirmed that the ginsenoside removed of hydroxyl (—OH) group is detected from coffee seeds manufactured from coffee trees cultivated through the red ginseng powdered extract aqueous solution containing the ginsenoside removed of hydroxyl (—OH) group as active ingredient. However, a conclusion has arrived that a mixture of red ginseng powdered extract is preferably 20 parts by weight, because the ginsenoside removed of hydroxyl (—OH) group does not increase, as the concentration of the red ginseng powdered extract aqueous solution containing the ginsenoside removed of hydroxyl (—OH) group as active ingredient increases.

FIG. 13 is a copy of an examination certificate of ingredient contents analysis of ginsenoside removed of hydroxyl group in a sample of stem grown according to an exemplary embodiment of the present disclosure, and FIG. 14 is a copy of an examination certificate of ingredient contents analysis of ginsenoside removed of hydroxyl group in a sample of leaf grown according to an exemplary embodiment of the present disclosure.

It was confirmed that the ginsenoside removed of hydroxyl (—OH) group can be detected not only from the coffee seeds but coffee tree stems and leaves through the FIGS. 13 and 14.

A drink composition may be provided that contains, as active ingredient, coffee bean powdered extract containing ginsenoside removed of hydroxyl group produced by the cultivating method of coffee tree according to an exemplary embodiment of the present disclosure.

Preferably, the drink composition contained with, as active ingredient, coffee bean powdered extract containing ginsenoside removed of hydroxyl group may include additional ingredients such as sweeteners (flavors) or natural carbohydrate.

The natural carbohydrate may include conventional sugar, such as mono saccharide (glucose, fructose, etc.), disaccharide (maltose, sucrose, etc.) and polysaccharide (dextrin, cyclodextrin), and sugar alcohol (xylitol, sorbitol, and erythritol). In addition to the foregoing flavors, natural flavors (thaumatin, stevia extracts, such as rebaudioside A and glycyrrhizin, etc., and synthetic flavors (saccharide, aspartame) may be advantageously used. Ratio of the natural carbohydrate may be generally about 1~20 g, preferably about 5~12 g per 100 ml of the composition according to the present disclosure.

A food additive containing, as active ingredient, coffee bean powdered extract containing ginsenoside removed of hydroxyl group manufactured by the cultivating method of coffee tree may be provided according to an exemplary embodiment of the present disclosure.

Preferably, the food additive containing, as active ingredient, coffee bean powdered extract containing ginsenoside removed of hydroxyl group may include such general food additives such as sweeteners, flavoring agents, coloring agents, fillers and stabilizers. The food additive containing, as active ingredient, coffee bean powdered extract containing ginsenoside removed of hydroxyl group may be added directly added to foods and drinks as it is, or may be used with other foods or food ingredients, and may be adequately used according to common usage. A mixing amount of active ingredients may be adequately determined according to usage purpose (prevention or improvement purpose) thereof. In general, an amount of compound in the health food may be 0.01~15% weight of a total food weight, preferably, 0.15% weight of the total food weight, and an amount of compound in the health food composition may be added by a ratio of 0.01~5.0 g based on 100, and preferably by 0.01~1.0 g. However, in case of long term intake for health control, the above amount may be less than the scope, and because there is no problem in terms of safety, an active ingredient may be used above an amount of the above scope.

Hereinafter, preferred exemplary embodiments, comparative examples and experimental examples will be provided in order to assist in understanding. However, it should be appreciated that the following exemplary embodiments, comparative examples and experimental examples are provided for exemplary purposes only, and are not provided to limit the protective scopes of the enclosed claims.

First Exemplary Embodiment: Germination Percent of Coffee Beans Rested by being Dipped in the Red Ginseng Powdered Extract Aqueous Solution Containing, as Active Ingredient, Ginsenoside Removed of Hydroxyl (—OH) Group The germination percent was measured by germination after dipping and resting the coffee beans in the red ginseng powdered extract aqueous solution containing, as active ingredient, ginsenoside removed of hydroxyl (—OH) group.

The red ginseng powdered extract aqueous solution containing, as active ingredient, ginsenoside removed of hydroxyl (—OH) group was prepared by water 100 parts by weight and 20 parts by weight of red ginseng powdered extract aqueous solution containing, as active ingredient, ginsenoside removed of hydroxyl (—OH) group. At this time, the temperature of red ginseng powdered extract aqueous solution was 25° C., and the rest time was given as 12 hour, a result of which is shown as in the following Table 1.

First Comparative Example: Germination Percent of Coffee Beans Dipped and Rested in the Red Ginseng Powdered Extract Aqueous Solution Containing as Active Ingredient, Ginsenoside Removed of Hydroxyl (—OH) Group The germination percent was measured by germination after dipping and resting the coffee beans in the red ginseng powdered extract aqueous solution containing, as active ingredient, ginsenoside removed of hydroxyl (—OH) group.

The red ginseng powdered extract aqueous solution containing, as active ingredient, ginsenoside removed of hydroxyl (—OH) group was prepared by water 100 parts by weight and 20 parts by weight of red ginseng powdered extract aqueous solution containing, as active ingredient, ginsenoside removed of hydroxyl (—OH) group. At this time, the temperature of red ginseng powdered extract aqueous solution was 25° C., and the rest time was given as 12 hour, a result of which is shown in the following Table 1.

Second Comparative Example: Germination Percent of Coffee Beans Dipped and Rested in General Water Germination percent was measured by resting the coffee beans in general water and germinating the rested coffee beans. Temperature of the general water was given at 25° C., and rest time was given at 12 hours, a result of which is shown in the following Table 1.

Third Comparative Example: Germination Percent of not-Rested Coffee Beans

Germination percent was measured for coffee beans not rested, a result of which is given as in the following Table 1.

TABLE 1

| Exemplary embodiments and comparative examples | Germination percent (%) |
| --- | --- |
| First exemplary embodiment | 98 |
| First comparative example | 75 |
| Second comparative example | 75 |
| Third comparative example | 65 |

Table 1 shows germination percent according to coffee beans under resting condition.

As defined in Table 1, it could be learned from the first exemplary embodiment. that the germination percent is significantly high in the coffee beans rested by being dipped in the red ginseng powdered extract aqueous solution containing, as active ingredient, ginsenoside removed of hydroxyl (—OH) group.

First Experimental Example: Germination Percent of Coffee Beans Dipped and Rested in the Red Ginseng Powdered Extract Aqueous Solution Containing, as Active Ingredient, Ginsenoside Removed of Hydroxyl (—OH) Group The germination percent was measured by germination after dipping and resting the coffee beans in the red ginseng powdered extract aqueous solution containing, as active ingredient, ginsenoside removed of hydroxyl (—OH) group. At this time, the coffee beans were divided to 8 groups, and each group is dipped and rested in different time in the red ginseng powdered extract aqueous solution including, as active ingredient, ginsenoside removed of hydroxyl (—OH) group. The red ginseng powdered extract aqueous solution including, as active ingredient, ginsenoside removed of hydroxyl (—OH) group was prepared by mixing water 100 parts by weight and 20 parts by weight of red ginseng powdered extract aqueous solution including, as active ingredient, ginsenoside removed of hydroxyl (—OH) group. At this time, the temperature of red ginseng powdered extract aqueous solution was 25° C., and the rest time was given at one 1 hour, 6 hours, 10 hours, 12 hours, 14 hours, 18 hours, 24 hours and 30 hours respectively, a result of which is shown as in the following Table 2.

TABLE 2

| Experimental materials | Germination percent (%) for each rest time | | | | | | | |
|---|---|---|---|---|---|---|---|---|
| | 1 hour | 6 hours | 10 hours | 12 hours | 14 hours | 18 hours | 24 hours | 30 hours |
| Coffee beans in the red ginseng powdered extract aqueous solution containing, as active ingredient, ginsenoside removed of hydroxyl group | 75 | 75 | 80 | 98 | 80 | 70 | 40 | 25 |

Table 2 shows germination percent for each rest time of coffee beans dipped and rested in the red ginseng powdered extract aqueous solution containing, as active ingredient, ginsenoside removed of hydroxyl (—OH) group.

As defined in Table 2, it can be noted through the first experimental example that the germination percent of coffee beans dipped and rested in the red ginseng powdered extract aqueous solution containing, as active ingredient, ginsenoside removed of hydroxyl (—OH) group was differently measured depending on rest time.

However, although the germination percent increased as the rest time was prolonged, the germination percent of coffee beans decreased after 12 hours. In connection therewith, a conclusion has arrived at a fact that it is preferable to have the rest time at 12 hours.

Second Experimental Example: Detection Amount of Ginsenoside Removed of Hydroxyl (—OH) Group in Coffee Beans Dipped and Rested in the Red Ginseng Powdered Extract Aqueous Solution Containing, as Active Ingredient, Ginsenoside Removed of Hydroxyl (—OH) Group Detection amount of ginsenoside removed of hydroxyl (—OH) group was analyzed after dipping and resting the coffee beans in the red ginseng powdered extract aqueous solution containing, as active ingredient, ginsenoside removed of hydroxyl (—OH) group. At this time, the coffee beans were divided to 6 groups, and each group is dipped and rested in the red ginseng powdered extract aqueous solution including, as active ingredient, ginsenoside removed of hydroxyl (—OH) group, each group having a different mixed amount. The red ginseng powdered extract aqueous solution including, as active ingredient, ginsenoside removed of hydroxyl (—OH) group was prepared by mixing water 100 parts by weight and respectively 20, 30, 40, 50, 60, 70 parts by weight of red ginseng powdered extract aqueous solution including, as active ingredient, ginsenoside removed of hydroxyl (—OH) group. At this time, the temperature of red ginseng powdered extract aqueous solution was 25° C., and the rest time was given at 12 hours, a result of which is shown as in the following Table 3.

TABLE 3

| Experimental materials | Rest time | Mixed ratio of red ginseng powdered extract per water 100 parts by weight of red ginseng powdered extract aqueous solution including, as active ingredient, ginsenoside removed of hydroxyl group | Detection amount of ginsenoside removed of hydroxyl group |
|---|---|---|---|
| Coffee beans | 12 hours | 20 parts by weight | 7.31 mg/g |
| Coffee beans | 12 hours | 30 parts by weight | 6.03 mg/g |
| Coffee beans | 12 hours | 40 parts by weight | 6.41 mg/g |
| Coffee beans | 12 hours | 50 parts by weight | 8.04 mg/g |
| Coffee beans | 12 hours | 60 parts by weight | 5.91 mg/g |
| Coffee beans | 12 hours | 70 parts by weight | 7.28 mg/g |

Table 3 defines detection amount of ginsenoside removed of hydroxyl (—OH) group in the coffee beans having passed the rest period.

As indicated in the Table 3, it can be confirmed through the second experimental example that ginsenoside removed of hydroxyl (—OH) group was detected from the coffee beans having the rest period by dipping in red ginseng powdered extract aqueous solution including, as active ingredient, ginsenoside removed of hydroxyl (—OH) group.

However, a conclusion has arrived at a fact that it is preferable to have the mixed amount of red ginseng powdered extract at 20 parts by weight, because the ginsenoside removed of hydroxyl (—OH) group does not increase, as the concentration of red ginseng powdered extract aqueous solution including, as active ingredient, ginsenoside removed of hydroxyl (—OH) group increases.

Second Exemplary Embodiment: Yield of Coffee Beans of Coffee Trees Grown by being Supplied with Red Ginseng Powdered Extract Aqueous Solution Including, as Active Ingredient Ginsenoside Removed of Hydroxyl (—OH) Group Yield was measured from coffee beans of coffee trees grown in a coffee seed-planted soil by being supplied with red ginseng powdered extract aqueous solution including, as active ingredient, ginsenoside removed of hydroxyl (—OH) group.

The red ginseng powdered extract aqueous solution including, as active ingredient, ginsenoside removed of hydroxyl (—OH) group was prepared by mixing water 100 parts by weight and 20 parts by weight of red ginseng powdered extract aqueous solution including, as active ingredient, ginsenoside removed of hydroxyl (—OH) group.

The red ginseng powdered extract aqueous solution including, as active ingredient, ginsenoside removed of hydroxyl (—OH) group was continuously supplied to the coffee seed-planted soil with 2,000 mm precipitation at one time interval for each three days under a 25° C. room temperature. Yields of coffee beans produced from coffee beans from coffee trees cultivated by the above methods are measured for a total of 4 (four) years, a result of which is shown as in the following Table 4:

Fourth Comparative Example: Yield of Coffee Beans of Coffee Trees Grown by being Supplied with Red Ginseng Powdered Extract Aqueous Solution Containing Ginsenoside Inclusive of Hydroxyl (—OH) Group Yield was measured from coffee beans of coffee trees grown in a coffee seed-planted soil by being supplied with red ginseng powdered extract aqueous solution containing ginsenoside inclusive of hydroxyl (—OH) group as active ingredient.

At this time, the red ginseng powdered extract aqueous solution including ginsenoside of hydroxyl (—OH) group as active ingredient was prepared by mixing water 100 parts by weight and 20 parts by weight of red ginseng powdered extract aqueous solution containing ginsenoside inclusive of hydroxyl (—OH) group as active ingredient.

The red ginseng powdered extract aqueous solution including ginsenoside of hydroxyl (—OH) group as active ingredient was continuously supplied to the coffee seed-planted soil with 2,000 mm precipitation at one time interval for each three days under a 25° C. room temperature. Yields of coffee beans produced from coffee beans from coffee trees cultivated by the above methods were measured for a total of 4 (four) years, a result of which is shown as in the following Table 4:

Fifth Comparative Example: Yield of Coffee Beans from Coffee Trees Grown by being Supplied with General Water Yield was measured of coffee beans from coffee trees in a coffee seed-planted soil and grown by being supplied with general water The general water was continuously supplied to the coffee seed-planted soil with 2,000 mm precipitation at one time interval for each three days under a 25° C. room temperature. Yields of coffee beans produced from coffee beans from coffee trees cultivated by the above methods were measured for a total of 4 (four) years, a result of which is shown as in the following Table 4.

TABLE 4

| Exemplary embodiment & comparative examples | Yield of coffee beans (%) | | | |
|---|---|---|---|---|
| | First year | Second year | Third year | Fourth year |
| Second exemplary embodiment | 80 | 40 | 85 | 40 |
| Fourth comparative example | 40 | 10 | 45 | 15 |
| Fifth comparative example | 35 | 5 | 35 | 5 |

Table 4 shows yields of coffee beans based on conditions of water supplied to coffee trees.

It can be learned from the Table 4 that yields of coffee bean-obtained first and third years were generally high. The coffee beans are born at areas from which leaves fall, and the coffee tree leaves and coffee beans are alternately born. Due to this reason, the yield of coffee beans becomes high at every two-year period.

Furthermore, it could be learned from the Table 4 through the second exemplary embodiment of the present disclosure that the yield is significantly high from coffee beans of coffee trees planted in coffee-seed planted soil and grown by being supplied with red ginseng powdered extract aqueous solution including, as active ingredient, ginsenoside removed of hydroxyl (—OH) group. The reason of the increased yield of coffee beans is interpreted from the strengthened immunity level of coffee trees.

Third Exemplary Embodiment: Pest Occurrences on Coffee Trees Grown by being Supplied with Red Ginseng Powdered Extract Aqueous Solution Including, as Active Ingredient, Ginsenoside Removed of Hydroxyl (—OH) Group Peat occurrences were measured on coffee trees grown by being supplied with red ginseng powdered extract aqueous solution including, as active ingredient, ginsenoside removed of hydroxyl (—OH) group.

At this time, the red ginseng powdered extract aqueous solution including ginsenoside of removed of hydroxyl (—OH) group as active ingredient was prepared by mixing water 100 parts by weight and 20 parts by weight of red ginseng powdered extract aqueous solution including ginsenoside removed of hydroxyl (—OH) group as active ingredient.

The red ginseng powdered extract aqueous solution including ginsenoside removed of hydroxyl (—OH) group as active ingredient was continuously supplied to the coffee seed-planted soil with 2,000 mm precipitation at one time interval for each three days under a 25° C. room temperature. Occurrences of pests from coffee beans produced from coffee beans from coffee trees cultivated by the above methods were measured for a total of 4 (four) years, a result of which is shown as in the following Table 5:

Sixth Comparative Example: Pest Occurrences on Coffee Trees Grown by being Supplied with Red Ginseng Powdered Extract Aqueous Solution Containing Ginsenoside Inclusive of Hydroxyl (—OH) Group as Active Ingredient Pest occurrences were measured on coffee trees grown by being supplied with red ginseng powdered extract aqueous solution including ginsenoside inclusive of hydroxyl (—OH) group as active ingredient.

At this time, the red ginseng powdered extract aqueous solution including ginsenoside inclusive of removed of hydroxyl (—OH) group as active ingredient was prepared by mixing water 100 parts by weight and 20 parts by weight of red ginseng powdered extract aqueous solution containing ginsenoside inclusive of hydroxyl (—OH) group as active ingredient.

The red ginseng powdered extract aqueous solution including ginsenoside inclusive of hydroxyl (—OH) group as active ingredient was continuously supplied to the coffee seed-planted soil with 2,000 mm precipitation at one time interval for each three days under a 25° C. room temperature. Pest occurrences from coffee beans produced from coffee beans from coffee trees cultivated by the above methods were measured for a total of 4 (four) years, a result of which is shown as in the following Table 5:

Seventh Comparative Example 7: Pest Occurrences on Coffee Trees Grown by being Supplied with General Water Pest occurrences were measured on coffee trees in coffee seed-planted soil and grown by being supplied with general water.

The general water was continuously supplied to the coffee seed-planted soil with 2,000 mm precipitation at one time interval for each three days under a 25° C. room temperature. Pest occurrences on coffee trees cultivated by the above methods were measured for a total of 4 (four) years, a result of which is shown as in the following Table 5.

TABLE 5

| Exemplary embodiments & Comparative examples | Pest occurrences on coffee trees (%) | | | |
| --- | --- | --- | --- | --- |
| | First year | Second year | Third year | Fourth year |
| Third exemplary embodiment | 3 | 3 | 2 | 2 |
| Sixth comparative example | 15 | 15 | 10 | 10 |
| Seventh comparative example | 20 | 20 | 20 | 20 |

Table 5 shows occurrences of pests on coffee trees based on conditions of water supplied to the coffee trees.

As shown in Table 5, it could be learned through the third exemplary embodiment of the present disclosure that pest occurrences were significantly low on coffee trees grown in coffee seed-planted soil and grown by being supplied with red ginseng powdered extract aqueous solution including ginsenoside removed of hydroxyl (—OH) group as active ingredient The decrease of pest occurrences on the coffee trees is interpreted as being due to increased immunity level of the coffee trees.

Third Experimental Example: Detection Amount of Ginsenoside Removed of Hydroxyl (—OH) Group in Coffee Beans Manufactured from Coffee Trees Grown by being Supplied with Red Ginseng Powdered Extract Aqueous Solution Containing Ginsenoside Removed of Hydroxyl (—OH) Group as Active Ingredient Measurement was made on detection amounts of ginsenoside removed of hydroxyl (—OH) group in coffee beans manufactured from coffee trees grown by being supplied with red ginseng powdered extract aqueous solution containing ginsenoside removed of hydroxyl (—OH) group as active ingredient At this time, a plurality of coffee trees was divided to 6 groups, and each group is supplied with red ginseng powdered extract aqueous solution including, as active ingredient, ginsenoside removed of hydroxyl (—OH) group, each group having a different mixed amount. The red ginseng powdered extract aqueous solution including, as active ingredient, ginsenoside removed of hydroxyl (—OH) group was prepared by mixing water 100 parts by weight and respectively 20, 30, 40, 50, 60, 70 parts by weight of red ginseng powdered extract aqueous solution including, as active ingredient, ginsenoside removed of hydroxyl (—OH) group.

At this time, the red ginseng powdered extract aqueous solution including, as active ingredient, ginsenoside removed of hydroxyl (—OH) group was continuously supplied to the coffee seed-planted soil with 2,000 mm precipitation at one time interval for each three days under a 25° C. room temperature. In order to ascertain whether the coffee beans manufactured from the thus mentioned coffee trees contain the red ginseng powdered extract aqueous solution including, as active ingredient, ginsenoside removed of hydroxyl (—OH) group, analysis was made on detection amounts of ginsenoside removed of hydroxyl (—OH) group in coffee beans manufactured from 6 (six) groups of coffee trees, a result of which is shown as in the following Table 6.

TABLE 6

| Experimental materials | Mixed ratio of red ginseng powdered extract aqueous solution against water 100 parts by weight of red ginseng powdered extract aqueous solution including, ginsenoside removed of hydroxyl group as active ingredient | Detection amount of ginsenoside removed of hydroxyl group |
| --- | --- | --- |
| Coffee beans | 20 parts by weight | 5.59 mg/g |
| Coffee beans | 30 parts by weight | 5.91 mg/g |
| Coffee beans | 40 parts by weight | 5.53 mg/g |
| Coffee beans | 50 parts by weight | 6.15 mg/g |
| Coffee beans | 60 parts by weight | 5.72 mg/g |
| Coffee beans | 70 parts by weight | 5.69 mg/g |

Table shows detection amounts of ginsenoside removed of hydroxyl (—OH) group in coffee beans manufactured from coffee trees grown by being supplied with red ginseng powdered extract aqueous solution containing ginsenoside removed of hydroxyl (—OH) group as active ingredient As shown in Table 6, it can be confirmed through the third experimental example that ginsenoside removed of hydroxyl (—OH) group was detected from the coffee beans manufactured from coffee trees grown by being supplied with red ginseng powdered extract aqueous solution including, as active ingredient, ginsenoside removed of hydroxyl (—OH) group.

However, a conclusion has arrived at a fact that it is preferable to have the mixed amount of red ginseng powdered extract at 20 parts by weight, because the ginsenoside removed of hydroxyl (—OH) group does not increase, as the concentration of red ginseng powdered extract aqueous solution including, as active ingredient, ginsenoside removed of hydroxyl (—OH) group increases.

Fourth Experimental Example: Detection Amounts of Ginsenoside Removed of Hydroxyl (—OH) Group in Stems and Leaves of Coffee Trees Grown by being Supplied with Red Ginseng Powdered Extract Aqueous Solution Including, as Active Ingredient, Ginsenoside Removed of Hydroxyl (—OH) Group Measurement was made on detection amounts of ginsenoside removed of hydroxyl (—OH) group in stems and leaves of coffee trees grown by being supplied with red ginseng powdered extract aqueous solution including, as active ingredient, ginsenoside removed of hydroxyl (—OH) group.

The red ginseng powdered extract aqueous solution including, as active ingredient, ginsenoside removed of hydroxyl (—OH) group was prepared by mixing water 100 parts by weight and 20 parts by weight of red ginseng powdered extract aqueous solution including, as active ingredient, ginsenoside removed of hydroxyl (—OH) group. At this time, the red ginseng powdered extract aqueous solution including, as active ingredient, ginsenoside removed of hydroxyl (—OH) group was continuously supplied to the coffee seed-planted soil with 2,000 mm precipitation at one time interval for each three days under a 25° C. room temperature. In order to ascertain whether the stems and leaves of coffee trees thus manufactured contain the red ginseng powdered extract aqueous solution including, as active ingredient, ginsenoside removed of hydroxyl (—OH) group, analysis was made on detection amounts of ginsenoside removed of hydroxyl (—OH) group in stems and leaves of coffee trees thus manufactured, a result of which is shown as in the following Table 7.

TABLE 7

| Experimental materials | Detection amounts of ginsenoside removed of hydroxyl group |
|---|---|
| Stems of coffee trees | 2.11 mg/g |
| Leaves of coffee trees | 6.60 mg/g |

Table 7 indicates detection amounts of ginsenoside removed of hydroxyl (—OH) group in stems and leaves of coffee trees grown by being supplied with red ginseng powdered extract aqueous solution including, as active ingredient, ginsenoside removed of hydroxyl (—OH) group.

As shown in Table 7, it can be confirmed through the fourth experimental example that ginsenoside removed of hydroxyl (—OH) group was detected from stems and leaves of the coffee trees manufactured by being supplied with red ginseng powdered extract aqueous solution including, as active ingredient, ginsenoside removed of hydroxyl (—OH) group.

This experiment is interpreted that ginsenoside removed of hydroxyl (—OH) group is contained on the whole in the coffee beans and coffee trees as well.

Although the above exemplary embodiments, comparative examples and experimental examples of the present disclosure have been described, these exemplary embodiments, comparative examples and experimental examples are merely exemplary and do not limit the present invention, so that persons who skilled in the art of the present disclosure may easily transform and modify within the limit of the technical spirit of the present disclosure. Thus, the scope of the present disclosure is as defined in the attached claims of the present disclosure and the equivalents thereof.

What is claimed is:

1. A method for cultivating a coffee tree by using a red ginseng powdered extract, comprising: resting a coffee seed by dipping the coffee seed in an aqueous solution of the red ginseng powdered extract for a predetermined period of time to produce a rested coffee seed; wherein the aqueous solution of the red ginseng powdered extract includes ginsenoside as an active ingredient, and wherein the ginsenoside has a hydroxyl group removed by passing the aqueous solution of red ginseng, powdered extract through a semipermeable membrane wherein a hydrogen ion has been introduced to the semipermeable membrane from outside through a hydrogen ion supply route.

2. The method of claim 1, wherein the rested coffee seed is planted in soil.

3. The method of claim 1, wherein the red ginseng extract aqueous solution is a mixture of water 100 parts by weight and red ginseng powdered extract 10~30 parts by weight.

4. The method of claim 1, wherein the step of resting the coffee seed includes dipping the coffee seed in the red ginseng powdered extract aqueous solution at a room temperature of 20~30° C.

5. The method of claim 1, further comprising supplying red ginseng powdered extract aqueous solution to a soil planted with the coffee seed, subsequent to the step of planting the rested coffee seed in the soil.

6. The method of claim 5, wherein the step of supplying the red ginseng powdered extract aqueous solution to the soil planted with the coffee seed is at a room temperature of 20° C.~30° C.

7. The method of claim 5, wherein the step of planting the rested coffee seed in the soil includes planting the rested coffee seed in a flower pot.

* * * * *